2,780,622

PROCESS AND PRODUCT

Hansjuergen A. Schroeder, Columbus, Ohio, assignor to Olin Mathieson Chemical Corporation, a corporation of Virginia No Drawing. Application November 23, 1955, Serial No. 548,785

4 Claims. (Cl. 260—249.5)

This invention relates to 2-aryl-4-hydroxy-6-amino-1,3,5-triazine oxides. It also relates to a process for their preparation by oxidation with Caro's acid of 2,4-diaryl-6-amino-1,3,5-triazines according to the following reaction.

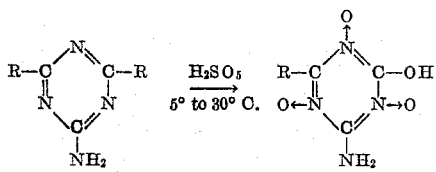

In the above formulae, R stands for an aryl group for example, a phenyl group, etc. The aryl group can be substituted by halogens such as bromine and chlorine as for example a p-chlorophenyl group. The reactants of this novel process have aryl groups in the 2- and 4-positions and an amino group in the 6-position of the 1,3,5-triazine ring.

Caro's acid is a common oxidizing agent which is usually formulated as $H_2SO_5$ and can be prepared by mixing hydrogen peroxide with fuming sulfuric acid. The hydrogen peroxide employed may preferably be of 30% concentration. It is known that Caro's acid acting on a primary amino group attached to a tertiary carbon atom produces substituted hydroxyl amines in low yields. For example, this is true when Caro's acid acts on 2,4-bis(p-chlorophenyl)-6-amino-1,3,5-triazine at a temperature of about 3° C. It is also known that primary amino groups may be converted to nitro groups by oxidation; for example alpha-amino pyridine is oxidized to alpha-nitro pyridine by means of Caro's acid. German Patent 363,930 discloses the preparation of beta-nitro anthraquinone by oxidation of beta-amino anthraquinone with persulfuric acid ($H_2S_2O_8$). It is also known that tertiary amines of the aliphatic or mixed aliphatic-aromatic type, for example dimethylaniline, on treatment with Caro's acid yield the tertiary amine oxides. Amine oxides are also obtained when tertiary nitrogen is part of a ring structure as for example in many alkaloids. It has long been known that pyridine yields pyridine N-oxide when oxidized with perbenzoic acid.

In view of the reactions noted above it might be expected that the action of Caro's acid on diaryl-amino-1,3,5-triazines would yield diaryl-nitro-triazines, diaryl-amino-1,3,5-triazine-N-oxides or diaryl-nitro-1,3,5-triazine-N-oxides depending on whether the oxidizing reagent attacks the amino group, the ring nitrogen atoms or both.

I have made the surprising discovery that Caro's acid acting on diaryl-amino-1,3,5-triazines at temperatures of about 5 to about 30° C. produces 2-aryl-4-hydroxy-6-amino-1,3,5-triazine oxides. It is indeed surprising that the oxidizing agent attacks one of the aryl groups oxidizing it to an acidic hydroxyl group while simultaneously converting the ring nitrogen atoms to N-oxides without attacking the primary amino group. This reaction is most unusual in that primary amino groups are usually more susceptible to oxidation than aryl groups. Thus in view of the teachings of the prior art it is surprising both that one aryl group is oxidized to the exclusion of the other and that the amino group is unaltered. I have found that complete oxidation of the amino group and the aryl substituents is likely to occur at temperatures above 30° C. I prefer to carry out my novel process in the temperature range of from 5 to 20° C.

One method of conducting my process comprises the steps of dissolving a 2,4-diaryl-6-amino-1,3,5-triazine in cold concentrated sulfuric acid, adding cold Caro's acid dropwise to the solution with stirring while maintaining the temperature from about 5 to 30° C. When the reaction is substantially complete the mixture is cooled, preferably by pouring it over crushed ice, and partially neutralized with alkali while maintaining the temperature below about 10° C. The resulting precipitate is filtered immediately, washed with ice water and dried with any suitable drying agent.

My invention is further illustrated by the following specific examples.

Example I

Three parts by weight of 2,4-diphenyl-6-amino-1,3,5-triazine were dissolved in 32 parts by weight of cold concentrated sulfuric acid with stirring. To the clear solution, a cold mixture of 30 parts of weight of 30% hydrogen peroxide and 120 parts by weight of 30% oleum was added dropwise with efficient stirring, maintaining the temperature at about 5° C. The mixture was allowed to warm for 2 hours to 15° C. and then kept for 4 hours at 5° C. The reaction mixture was poured onto 1000 parts by weight of crushed ice and 50% aqueous potassium hydroxide was added with stirring, maintaining the temperature below 10° C. until about one-third of the total acid was neutralized. The precipitate appearing at this point was filtered off immediately, washed with ice water and dried over phosphorus pentoxide.

Complete neutralization of the mother liquor yields a second precipitate which consists mainly of 2-amino-4-hydroxy-6-phenyl-1,3,5-triazine. The crude product, 2-phenyl-4-hydroxy-6-amino-1,3,5-triazine-tris-N-oxide was obtained as a monohydrate which was purified by recrystallization. The purified monohydrate softened, apparently with loss of water, at 160 to 170° C. and melted at 244 to 246° C. The compound was also obtained in anhydrous form by heating the monohydrate for one hour at 190° C. The anhydrous product melted at 244 to 246° C. The alcoholate which melted at 244 to 246° C., after softening at 160° C. with loss of alcohol was obtained by recrystallization from ethanol.

Example II

One part by weight of 2,4-bis (p-chlorophenyl)-6-amino-1,3,5-triazine dissolved in 11 parts by weight of concentrated sulfuric acid was added dropwise to a cold mixture of 10 parts by weight of 30% hydrogen peroxide and 40 parts by weight of 30% oleum, keeping the temperature at 18 to 20° C. for 20 minutes and at about 5° C. for 5 days. About one third of the acid was neutralized as described in Example I, the mixture yielding 2 - (p - chlorophenyl) - 4 - hydroxy - 6 - amino - 1, 3, 5 - triazine - tris - N - oxide in the form of a monohydrate which melted at 269° C. after softening at about 165° C. The alcoholate was formed by crystallization of the monohydrate from ethanol. It was dehydrated as described in Example I to obtain the anhydrous oxide, which melted at 269° C.

The 2 - R - 4 - hydroxy - 6 - amino - 1,3,5 - triazine-1, 3,5 - trioxides of the present invention (where R is phenyl or equivalent aryl group) can be used to advantage in the preparation of dyes by aminating nitro-halo-benzotrifluorides in accordance with the general process described in Daudt et al. Patent No. 2,212,825. The following example of the preparation of a dye that can be employed in accordance with standard practices in the art to dye acetate silk is illustrative.

*Example III*

Twenty parts of 3,5 - dinitro - 6 - chloro - benzo - trifluoride is dissolved in about 200 parts of anhydrous ether and 18 parts of finely powdered 2 - phenyl - 4 - hydroxy- 6 - amino - 1,3,5 - triazine - tris - N - oxide gradually added with vigorous stirring. After adding 7.5 parts of triethylamine to bind the liberated hydrochloric acid, the mixture is refluxed with stirring for 6 hours. The reaction product is then filtered off and washed with water to remove triethylamine hydrochloride. The resulting dye is a yellow-orange micro-crystalline mass which dyes acetate silk in orange shades of yellow. A further crop of the dye can be obtained by concentrating the ethereal mother liquor.

The foregoing examples are illustrative only and are not to be considered as limiting the scope of the invention.

The present application is a continuation-in-part of my prior application Serial No. 434,060, filed June 2, 1954.

I claim:

1. The process for the preparation of 2-phenyl-4-hydroxy - 6 - amino - 1,3,5 - triazine 1,3,5 - trioxide which comprises treating 2,4 - diphenyl - 6 - amino - 1,3,5 - triazine with $H_2SO_5$ at a temperature of about 5 to 30° C.

2. The process for the preparation of 2-chloro-phenyl- 4 - hydroxy - 6 - amino - 1,3,5 - triazine 1,3,5 - trioxide which comprises treating 2,4 - bis (chlorophenyl) - 6- amino - 1,3,5 - triazine with $H_2SO_5$ at a temperature of about 5 to 30° C.

3. 2 - phenyl - 4 - hydroxy - 6 - amino - 1,3,5 - triazine 1,3,5 - trioxide.

4. 2 - (p - chlorophenyl) - 4 - hydroxy - 6 - amino - 1, 3,5 - triazine 1,3,5 - trioxide.

No references cited.